United States Patent
Gao et al.

(10) Patent No.: US 12,323,324 B2
(45) Date of Patent: Jun. 3, 2025

(54) PACKET FORWARDING METHOD, PACKET SENDING METHOD, DEVICE, AND COMPUTER-READABLE MEDIUM

(71) Applicant: ZTE CORPORATION, Guangdong (CN)

(72) Inventors: Chenqiang Gao, Guangdong (CN); Jinghai Yu, Guangdong (CN)

(73) Assignee: ZTE CORPORATION, Guangdong (CN)

(*) Notice: Subject to any disclaimer, the term of this patent is extended or adjusted under 35 U.S.C. 154(b) by 38 days.

(21) Appl. No.: 18/031,582

(22) PCT Filed: Oct. 11, 2021

(86) PCT No.: PCT/CN2021/123105
§ 371 (c)(1),
(2) Date: Apr. 12, 2023

(87) PCT Pub. No.: WO2022/078297
PCT Pub. Date: Apr. 21, 2022

(65) Prior Publication Data
US 2023/0379245 A1    Nov. 23, 2023

(30) Foreign Application Priority Data
Oct. 14, 2020   (CN) .......................... 202011099241.8

(51) Int. Cl.
*H04L 45/00*   (2022.01)
*H04L 45/741*  (2022.01)
*H04L 45/745*  (2022.01)

(52) U.S. Cl.
CPC .......... *H04L 45/566* (2013.01); *H04L 45/741* (2013.01); *H04L 45/745* (2013.01)

(58) Field of Classification Search
CPC ... H04L 45/566; H04L 45/741; H04L 45/745; H04L 45/122; H04L 45/20; H04W 72/0446
(Continued)

(56) References Cited

U.S. PATENT DOCUMENTS

| 7,106,740 | B1 * | 9/2006 | Leelanivas ............ H04L 45/742 370/392 |
| 9,853,904 | B2 * | 12/2017 | Patel ...................... H04L 47/621 |

(Continued)

FOREIGN PATENT DOCUMENTS

| CN | 110502584 A | 11/2019 |
| CN | 110708755 A | 1/2020 |

(Continued)

OTHER PUBLICATIONS

European Patent Office, extended European Search Report dated May 29, 2024, for corresponding EP application No. 21879341.2.
WIPO, International Search Report issued on Dec. 31, 2021.

*Primary Examiner* — Sargon N Nano
(74) *Attorney, Agent, or Firm* — Li & Cai Intellectual Property (USA) Office

(57) ABSTRACT

The present disclosure provides a packet forwarding method, applied to a forwarding device, including: receiving a target packet carrying source period information which includes a predetermined period length and a source period identification; and determining a corresponding forwarding period identification according to the predetermined period length and the source period identification; and forwarding the target packet in a forwarding period corresponding to the forwarding period identification. The present disclosure further provides a packet sending method, a forwarding device, a source device, and a computer-readable medium.

11 Claims, 4 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 10,594,618 | B1* | 3/2020 | Singh | .................. H04L 49/3072 |
| 10,833,992 | B1* | 11/2020 | Dickinson | ............. H04L 45/586 |
| 11,956,161 | B2* | 4/2024 | Harmatos | ................ H04L 47/56 |
| 2006/0274673 | A1* | 12/2006 | Fleury | .................... H04L 45/02 |
| | | | | 370/254 |
| 2007/0201461 | A1* | 8/2007 | Shinohara | ............... H04L 45/60 |
| | | | | 370/389 |
| 2008/0037423 | A1* | 2/2008 | Singh | ..................... H04L 45/02 |
| | | | | 370/230 |
| 2010/0098022 | A1* | 4/2010 | Keszei | ................... H04L 45/02 |
| | | | | 370/329 |
| 2011/0320570 | A1* | 12/2011 | Ewing | .................. H04L 67/025 |
| | | | | 709/230 |
| 2016/0119228 | A1* | 4/2016 | Gao | ........................ H04L 49/25 |
| | | | | 370/392 |
| 2016/0205014 | A1* | 7/2016 | Chen | .................. H04L 43/0829 |
| | | | | 370/216 |
| 2019/0069257 | A1* | 2/2019 | Iwakiri | .................. G07C 5/008 |
| 2019/0104054 | A1* | 4/2019 | McDonald | .............. H04L 45/24 |
| 2019/0158411 | A1* | 5/2019 | Nishimura | ............ H04L 43/022 |
| 2019/0297013 | A1* | 9/2019 | Xin | ......................... H04L 45/74 |
| 2021/0184781 | A1* | 6/2021 | Meng | .................... H04J 3/0638 |
| 2022/0278919 | A1* | 9/2022 | Meng | ..................... H04L 45/54 |

FOREIGN PATENT DOCUMENTS

| | | |
|---|---|---|
| CN | 110868363 A | 3/2020 |
| WO | WO 2019084970 A1 | 5/2019 |

* cited by examiner

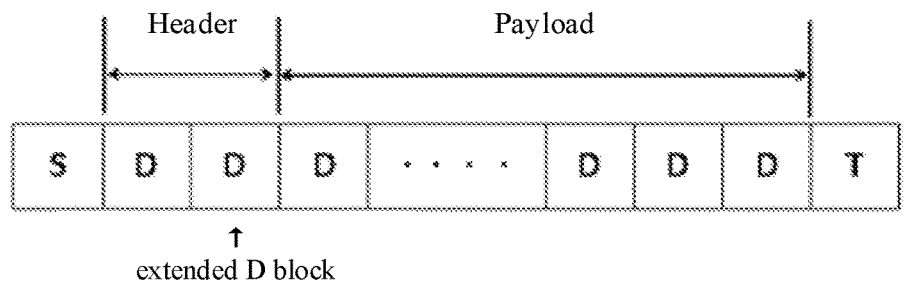
FIG. 5
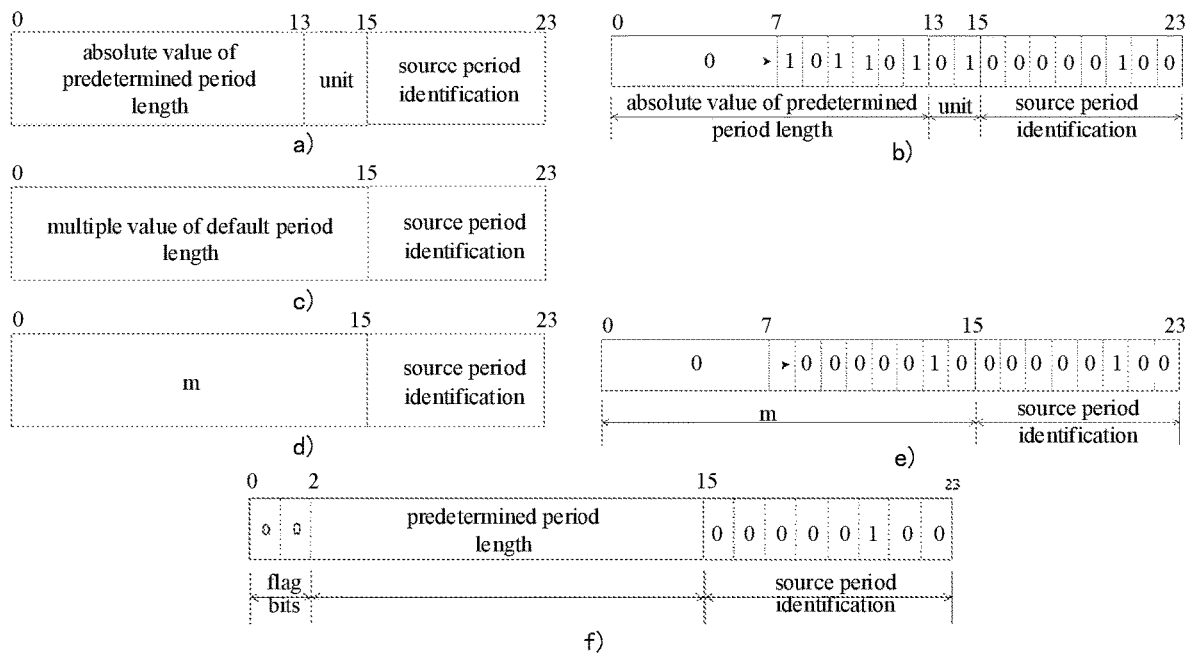
FIG. 6
FIG. 7

PACKET FORWARDING METHOD, PACKET SENDING METHOD, DEVICE, AND COMPUTER-READABLE MEDIUM

CROSS-REFERENCE TO RELATED APPLICATIONS

The present disclosure claims the priority to Chinese Patent Application No. 202011099241.8 filed on Oct. 14, 2020, the contents of which are incorporated herein by reference in their entirety.

TECHNICAL FIELD

The present disclosure relates to the field of communication technology, and in particular, to a packet forwarding method, a packet sending method, a forwarding device, a source device, and a computer-readable medium.

BACKGROUND

In the existing technology, two solutions are proposed for time synchronization of devices in a network: in a synchronous mode, all devices in the network are desired to be synchronized strictly in time, and a receiving port of each device determines a receiving time at which each packet is received, determines a specific receiving time period in which the packet falls, and sends the packet in a specified time period afterward; and in an asynchronous mode, different devices in the network are merely to be kept at synchronous frequencies and have time slices with a same size, respective phases of the devices are different, and in a packet forwarding process, each packet sent carries a period label, and each device determines, according to the period label, a period to forward out the packet.

In the asynchronous mode, the time slices of the network devices in the network are desired to have the same size, however, in practical applications, in a case where periods set by part of the network devices are not consistent with periods of the other network devices, for example, data packets sent by different data sources in the network are different in size and periods selected by the different data sources are also different, a downstream device cannot complete forwarding a packet sent by an upstream device within one period, so that the packet is forwarded across periods, and a delay jitter cannot be determined.

SUMMARY

In a first aspect, the present disclosure provides a packet forwarding method, applied to a forwarding device, including: receiving a target packet carrying source period information, the source period information including a predetermined period length and a source period identification; and determining a corresponding forwarding period identification according to the predetermined period length and the source period identification, and forwarding the target packet in a forwarding period corresponding to the forwarding period identification, with a length of the forwarding period being the same as the predetermined period length.

In a second aspect, the present disclosure further provides a packet sending method, applied to a source device, including: selecting a predetermined period length, and sending a target packet to a forwarding device in a sending period corresponding to the predetermined period length, with the target packet carrying source period information configured to indicate the sending period, and the source period information including the predetermined period length and a source period identification of the sending period.

In a third aspect, the present disclosure further provides a forwarding device, including: at least one processor; and a memory configured to store at least one program; the at least one program, executed by the at least one processor, causes the at least one processor to perform the packet forwarding method as described above.

In a fourth aspect, the present disclosure further provides a source device, including: at least one processor; and a memory configured to store at least one program; the at least one program, executed by the at least one processor, causes the at least one processor to perform the packet sending method as described above.

In a fifth aspect, the present disclosure further provides a computer-readable medium storing a computer program thereon, the computer program, executed by a processor, causes the processor to perform the packet forwarding method or the packet sending method as described above.

BRIEF DESCRIPTION OF DRAWINGS

FIG. 5 is a flowchart illustrating a packet sending method according to the present disclosure;

FIG. 6 is a schematic diagram of an encapsulation format of a slot cell according to the present disclosure;

FIG. 7 is a schematic diagram of a format of an extended D block in the encapsulation format shown in FIG. 6;

DETAILED DESCRIPTION

Figure 1:
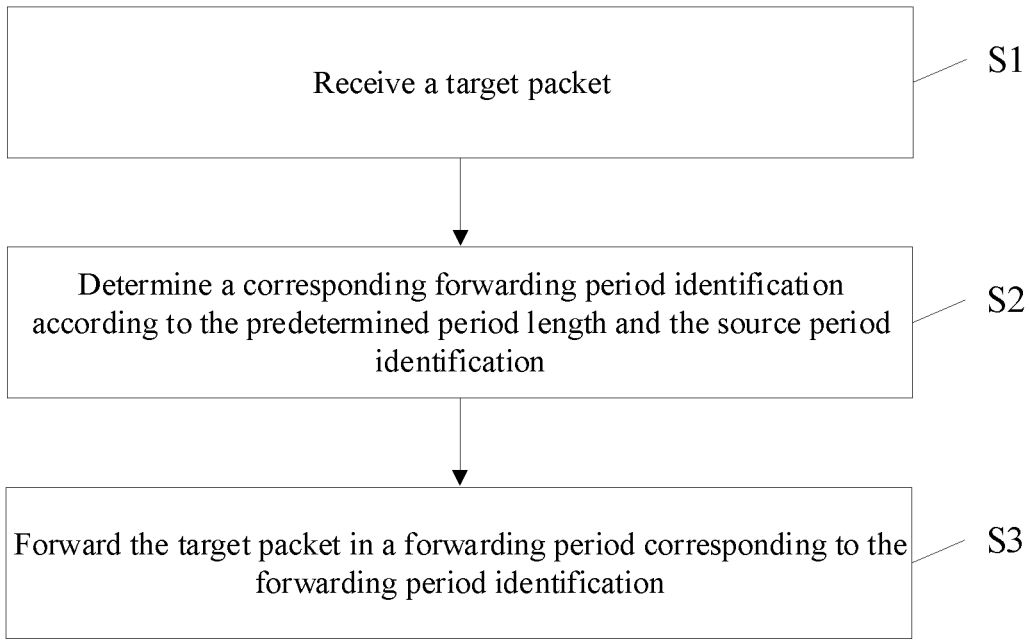
FIG. 1 is a flowchart illustrating a packet forwarding method according to the present disclosure.

In order to enable those of ordinary skill in the art to better understand technical solutions of the present disclosure, the packet forwarding method, the packet sending method, the forwarding device, the source device, and the computer-readable medium provided by the present disclosure are described in detail below with reference to the drawings.

Exemplary embodiments will be described more fully below with reference to the drawings, but the exemplary embodiments described herein may be embodied in different forms, and should not be interpreted as being limited to the embodiments described herein. The embodiments are provided to make the present disclosure more thorough and complete, and are intended to enable those of ordinary skill in the art to fully understand the scope of the present disclosure.

The terms used herein are merely used to describe specific embodiments, and are not intended to limit the present disclosure. As used herein, "a" and "the" which indicate a singular form are intended to include a plural form, unless expressly stated in the context. It should be further understood that the terms "comprise/include" and/or "be made/formed of" used herein indicate the presence of the particular features, integers, operations, elements and/or components, but do not exclude the presence or addition of one or more other features, integers, operations, elements, components and/or combinations thereof.

It should be understood that the terms "first", "second" and the like may be used herein to describe various elements, but those elements are not limited by those terms. Those terms are merely used for distinguishing one element from the other element. Therefore, without departing from the teaching of the present disclosure, a first element, a first component, or a first module described below may also be called a second element, a second component, or a second module.

Unless otherwise defined, all terms (including technical terms and scientific terms) used herein have the same meaning as commonly understood by those of ordinary skill in the art. It should be further understood that terms, such as those defined in commonly used dictionaries, should be interpreted as having a meaning that is consistent with a meaning in the context of the existing technology and the background of the present disclosure, and should not be interpreted in an idealized or overly formal sense unless expressly so defined herein.

By determining a corresponding forwarding period identification according to a predetermined period length and a source period identification carried in a target packet, and forwarding the target packet in a forwarding period corresponding to the forwarding period identification, the packet forwarding method, the packet sending method, the forwarding device, the source device, and the computer-readable medium provided by the present disclosure enable a device in a network to select the forwarding period according to source period information indicated in the packet, so as to avoid the packet to be forwarded across periods, and can accurately obtain the delay jitter. The methods and devices provided by the present disclosure are applicable to a Time-Sensitive Network (TSN), a Deterministic Network (DetNet), networks adopting IEEE 802.1Qbv and IEEE 802.1Qch, and other networks adopting a Circular Queue Forwarding (CQF) mechanism.

FIG. 1 is a flowchart illustrating a packet forwarding method according to the present disclosure. As shown in FIG. 1, the packet forwarding method is applied to a forwarding device (such as a router or a switch), and includes the following operations S1 to S3.

In operation S1, a target packet is received.

The target packet carries source period information, which includes a predetermined period length and a source period identification; and specifically, the source period information is configured to indicate a corresponding sending period in which an upstream device (which is prior to the forwarding device in a current link, and may be a forwarding device or a user-side device) relative to the forwarding device sends the target packet, and the source period identification is configured to identify the sending period, and includes a plurality of forms such as a period number and a period label.

In some implementations, the source period information further includes a unit of the predetermined period length. Specifically, the unit of the predetermined period length is a time unit, and may be set to be nanosecond, microsecond, millisecond, or second.

It should be noted that the source period information and the source period identification described in the operation S1 and similar concepts described below do not represent that the period information and the period identification are set and configured in the target packet by a source device, and are merely used to indicate a direct source of the target packet and a previous node in the communication link, that is, the upstream device relative to the forwarding device, and those concepts are related to the source device merely in a case where the upstream device is the source device.

In operation S2, a corresponding forwarding period identification is determined according to the predetermined period length and the source period identification.

In some implementations, for a network to which the forwarding device belongs, the network-wide time of the network is divided into a plurality of consecutive periods having a same length, the dividing process is based on a corresponding unit period length, and a plurality of dividing modes exist if a plurality of unit period lengths exist; and the forwarding device is pre-configured with a corresponding period identification for each period and a packet forwarding policy for each period, or the forwarding device receives period identifications and packet forwarding policies allocated by a network control plane.

Specifically, the packet forwarding policy may include: receiving a packet and forwarding the packet in a specific period after the sending period of the upstream device, the specific period may be determined by presetting a waiting period or specifying a period identification, and a specific moment in the specific period for forwarding the packet may be determined by random selection or calculation based on a size of the packet. Illustratively, the network-wide time of the network to which the forwarding device belongs is divided in a plurality of dividing modes, and the forwarding device is pre-configured with the corresponding period identification and the corresponding packet forwarding policy for each dividing mode according to network conditions, and the respective unit period lengths corresponding to the dividing modes are locally pre-stored in the forwarding device. Thus, after the target packet is received and the predetermined period length and the source period identification carried in the target packet are obtained, the operation S2 of determining the corresponding forwarding period identification according to the predetermined period length and the source period identification may include: in response to that the predetermined period length is equal to one of the unit period lengths, taking an $n^{th}$ period identification after the source period identification as the forwarding period identification in the corresponding dividing mode, that is, determining an $n^{th}$ period after a period corresponding to the source period identification as a forwarding period, with n being an integer; or, in response to that the predetermined period length is one of common multiples of any unit period length and 2, taking a next period identification having a same parity relation as the source period identification as the forwarding period identification under the unit period length.

It should be noted that the above description of determining the corresponding forwarding period identification according to the predetermined period length and the source period identification is merely for one implementation in the present disclosure, and does not limit the technical solutions of the present disclosure, and other ways of determining the forwarding period identification according to the predetermined period length and the source period identification are also applicable to the technical solutions of the present disclosure.

In operation S3, the target packet is forwarded in a forwarding period corresponding to the forwarding period identification.

A length of the forwarding period is the same as the predetermined period length in the source period information carried by the target packet.

In some implementations, between the operation S2 of determining the corresponding forwarding period identification according to the predetermined period length and the source period identification and the operation S3 of forwarding the target packet in the forwarding period corresponding to the forwarding period identification, the packet forwarding method further includes: replacing the source period identification in the source period information carried by the target packet with the forwarding period identification, so as to enable a downstream device (which is following the forwarding device in the current link, and may be a forwarding device or a user-side device) relative to the forwarding device to perform corresponding identification and processing according to the replaced source period information.

With the packet forwarding method provided by the present disclosure, the corresponding forwarding period identification is determined according to the predetermined period length and the source period identification carried in the target packet, and the target packet is forwarded in the forwarding period corresponding to the forwarding period identification, so that the device in the network can select the forwarding period according to the source period information indicated in the packet, thereby avoiding the packet to be forwarded across periods, and the delay jitter can be accurately obtained.

Figure 2:
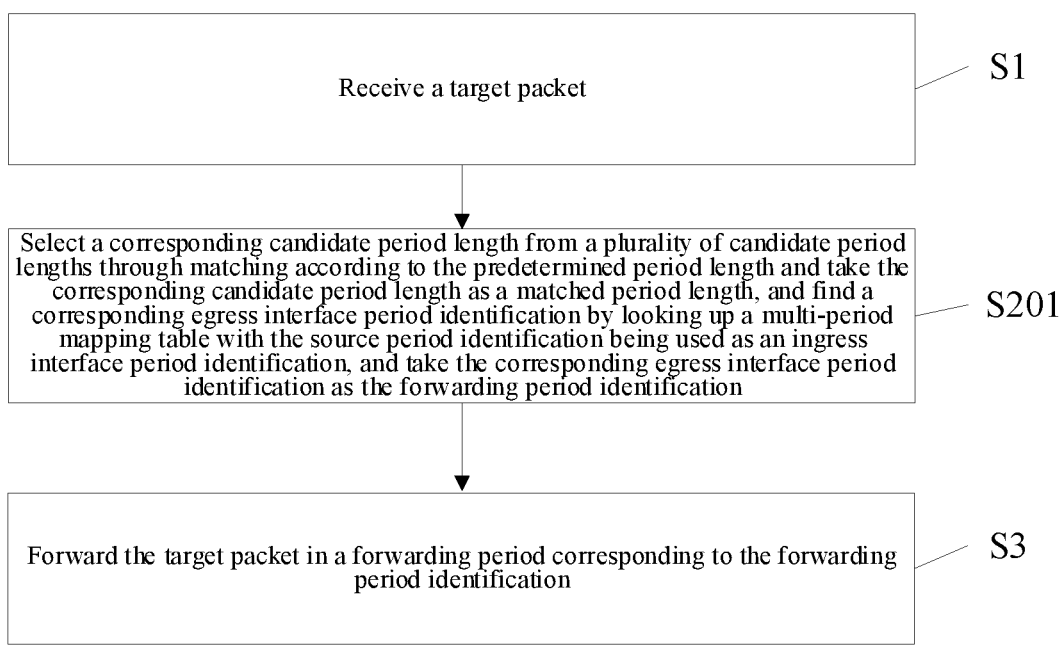
FIG. 2 is another flowchart illustrating the packet forwarding method according to the present disclosure.

FIG. 2 is another flowchart illustrating the packet forwarding method according to the present disclosure. As shown in FIG. 2, the packet forwarding method is a specific implementation based on the method illustrated by FIG. 1. Specifically, the packet forwarding method includes the operations S1 to S3, and the operation S2 of determining the corresponding forwarding period identification according to the predetermined period length and the source period identification further includes: operation S201.

In operation S201, a corresponding candidate period length is selected from a plurality of candidate period lengths through matching according to the predetermined period length and is taken as a matched period length, the source period identification is used as an ingress interface period identification, and a corresponding egress interface period identification is found by looking up a multi-period mapping table, and is taken as the forwarding period identification.

The multi-period mapping table records a mapping relationship between an ingress interface period identification and an egress interface period identification under each candidate period length, and the ingress interface period identification and the egress interface period identification correspond to an ingress interface and an egress interface of the forwarding device respectively, with the ingress interface and the egress interface configured for packet forwarding; and the plurality of candidate period lengths, i.e., the plurality of unit period lengths described above, are pre-stored in the forwarding device, and in general, the matched period length is the candidate period length, among all the candidate period lengths, that is equal to the predetermined period length in the source period information.

Figure 3:
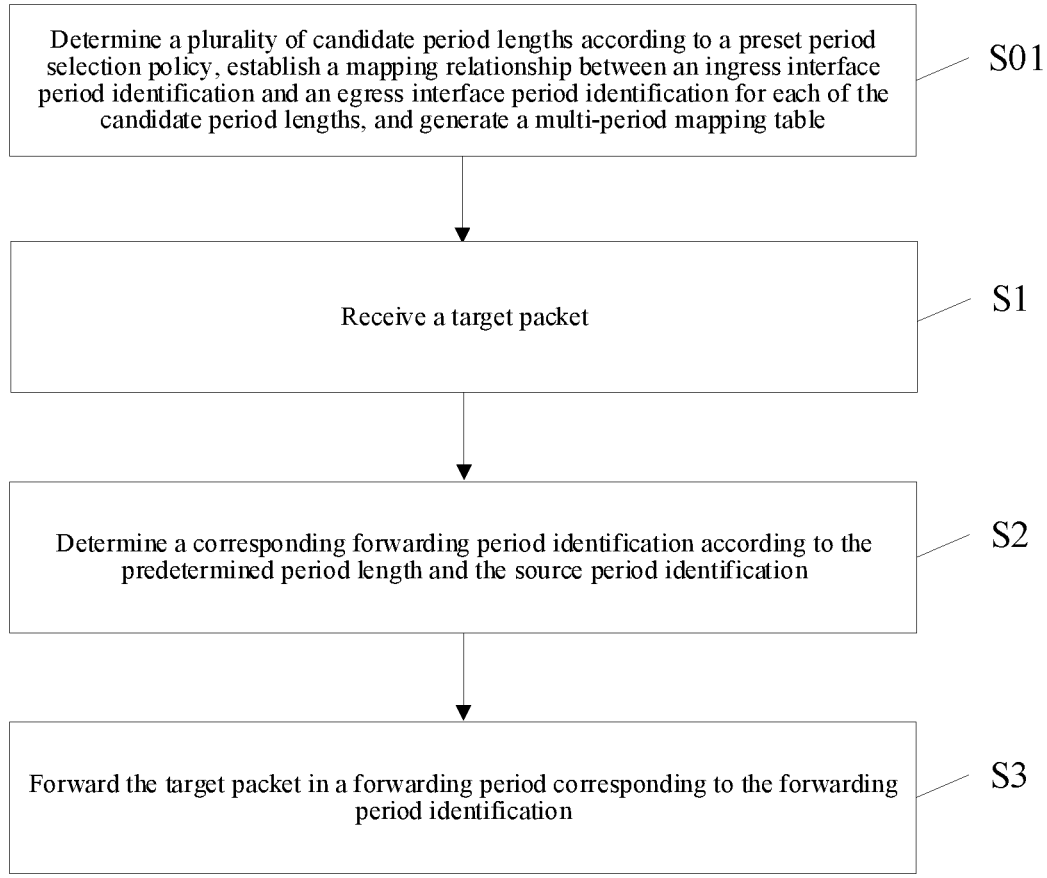
FIG. 3 is still another flowchart illustrating the packet forwarding method according to the present disclosure.

FIG. 3 is still another flowchart illustrating the packet forwarding method according to the present disclosure. As shown in FIG. 3, the packet forwarding method is a specific implementation based on the method illustrated by FIG. 2. Specifically, the packet forwarding method not only includes the operations S1 to S3, but also includes operation S01 before the operation S1 of receiving the target packet.

In operation S01, the plurality of candidate period lengths are determined according to a preset period selection policy, the mapping relationship between the ingress interface period identification and the egress interface period identification is established for each of the candidate period lengths, and the multi-period mapping table is generated.

Figure 4:
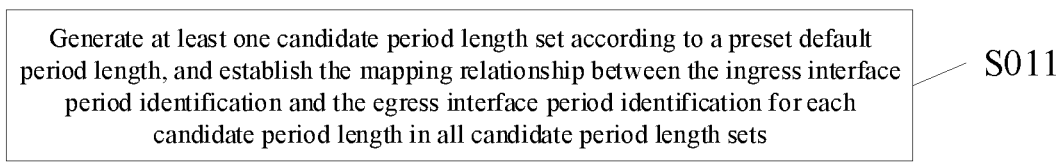
FIG. 4 is a flowchart illustrating an implementation of operation S01 according to the present disclosure.

FIG. 4 is a flowchart illustrating a specific implementation of the operation S01 according to the present disclosure. As shown in FIG. 4, the operation S01 of determining the plurality of candidate period lengths according to the preset period selection policy, and respectively establishing the mapping relationship between the ingress interface period identification and the egress interface period identification for each of the candidate period lengths includes: operation S011.

In operation S011, at least one candidate period length set is generated according to a preset default period length, and the mapping relationship between the ingress interface period identification and the egress interface period identification is established for each candidate period length in all candidate period length sets.

All the candidate period length sets that are generated include at least one of: a first set consisting of the default period length; a second set, in which all the candidate period lengths form an arithmetic progression having the default period length as a first term; and a third set, in which all the candidate period lengths form a geometric progression having the default period length as a first term. Accordingly, selecting one corresponding candidate period length from the plurality of candidate period lengths through matching according to the predetermined period length in the operation S2 is determining the candidate period length set to which the predetermined period length belongs.

Specifically, one or more default period lengths may be provided. In a case where a plurality of default period lengths are provided, the first set accordingly includes all the default period lengths, or a plurality of second sets may exist, with first terms of arithmetic progressions of the plurality of second sets being the default period lengths respectively, or a plurality of third sets may exist, with first terms of geometric progressions of the plurality of third sets being the default period lengths respectively; and simultaneously, there may be a case in which a same element is included in several candidate period length sets, that is, the predetermined period length in the target packet may be matched with the candidate period length in several different sets. The target packet sent by the source device carries corresponding flag information in the target packet for indicating the candidate period length set to which the predetermined period length belongs.

With the packet forwarding method provided by the present disclosure, multi-period mapping is realized in the network by determining the corresponding mapping relationship according to the predetermined period length and the source period identification carried in the target packet and determining the forwarding period identification, so that flexibility of the packet forwarding is improved, and applicability of the network is enhanced.

FIG. 5 is a flowchart illustrating a packet sending method according to the present disclosure. As shown in FIG. 5, the packet sending method is applied to a source device (such as a personal computer, a mobile terminal, or a tablet device), and includes: operation S4, selecting a predetermined period length, and sending a target packet to a forwarding device in a sending period corresponding to the predetermined period length.

The target packet carries source period information configured to indicate the sending period, and the source period information includes the predetermined period length and a source period identification of the sending period. Specifically, the predetermined period length may be selected according to a local policy or through a real-time system configuration.

In some implementations, the source period information may be carried by a slot cell, a Layer-2 Ethernet frame, an IPv4 header, or an IPv6 header.

FIG. 6 is a schematic diagram of an encapsulation format of a slot cell according to the present disclosure. As shown in FIG. 6, the slot cell has a fixed length, and includes one S block, a plurality of D blocks, and one T block. The cell includes Header and Payload, and an encoded client service is mapped to the Payload to be carried. Bytes in the Header represent the following contents: a tag value, time slice information, a serial number, a check value (a cyclic redundancy check algorithm), a management channel byte, a multi-frame number, and an Operation Administration and Maintenance (OAM) function field.

Specifically, one D block in the Header, i.e., an extended D block, may be used to carry the predetermined period length and the source period identification.

FIG. 7 is a schematic diagram of a format of an extended D block in the encapsulation format shown in FIG. 6. The D block corresponds to 8 bytes, and three low bytes in the D block may be used to carry the predetermined period length and the source period identification, for example, the first two bytes are used for the predetermined period length, and the last one byte is used for the source period identification.

Corresponding to various cases in which the candidate period length sets are generated in the forwarding device, for example, as shown in a) of FIG. 7, in the first two bytes of the three low bytes, the first 14 bits are configured to represent an absolute value of the predetermined period length, the following two bits are configured to represent a unit of the predetermined period length, with 00, 01, 10, and 11 corresponding to nanosecond, microsecond, millisecond, and second respectively, this example corresponds to the case where the first set consisting of the default period lengths is generated in the forwarding device, and the predetermined period length in this example is one of all the default period lengths; and specifically, as shown in b) of FIG. 7, in the first two bytes, the first 14 bits are 00000000101101 and the following two bits are 01, indicating that the predetermined period length is 45 microseconds, and the last one byte is 100, indicating that that a source period number (identification) is 4.

Alternatively, as shown in c) of FIG. 7, in the first two bytes of the three low bytes, the first 16 bits are configured to represent a quotient of the predetermined period length and the corresponding default period length, that is, a multiple value of the default period length, this example corresponds to the case where the second set is generated in the forwarding device, and the predetermined period length in this example is one element in the arithmetic progression consisting of all the candidate period lengths and having the default period length as the first term.

Alternatively, as shown in d) of FIG. 7, in the first two bytes of the three low bytes, the first 16 bits are configured to represent m, the predetermined period length is a product of the corresponding default period length and $2^m$, m is an integer, this example corresponds to the case where the third set is generated in the forwarding device, and the predetermined period length in this example is one element in the geometric progression consisting of all the candidate period lengths and having the default period length as the first item; and specifically, as shown in e) of FIG. 7, the default period length corresponding to the predetermined period length is 10 microseconds, and the 16 bits in the first two bytes represent m which is equal to 10, indicating that the predetermined period length is $10*2^2=40$ microseconds, and the last one byte is 100, indicating that the source period number (identification) is 4.

In some implementations, a plurality of candidate period length sets are generated in the forwarding device, and the source period information accordingly further includes the flag information, which is configured to indicate the candidate period length set to which the predetermined period length belongs and includes a flag bit or other forms. Specifically, as shown in f) of FIG. 7, in the first two bytes of the three low bytes, the first two bits are flag bits, the following 14 bits are configured to represent the predetermined period length in a corresponding form, the flag bits 00 may represent that the following 14 bits represents the absolute value of the predetermined period length, the flag bits 01 may represent that the following 14 bits represent the quotient of the predetermined period length and the corresponding default period length, the flag bits 10 may represent that the following 14 bits represent m, the predetermined period length is the product of the corresponding default period length and $2^m$, and m is an integer.

It should be noted that the above description of the case in which the slot cell carries the source period information is merely for one implementation of the present disclosure, and does not limit the technical solutions of the present disclosure; and the content represented by each byte and arrangement and orders of all the bytes may be adjusted and configured accordingly, and other encapsulation formats and representation ways are also applicable to the technical solutions of the present disclosure.

For the cases where the source period information is carried by the Layer-2 Ethernet frame, the IPv4 header, or the IPv6 header, the Layer-2 Ethernet frame may include a preamble, a start frame delimiter, a destination physical address (MAC), a source physical address, an 802.1Q tag, an Ether type, a payload, and a redundancy check part, and the source period information may be carried by the field of Ether type with two bytes; the IPv4 header may include a version, an IP header length, a service type, a packet length, a packet identification, a fragment, a fragment offset, a time to live, an upper protocol number, a header checksum, a source IPv4 address, a destination IPv4 address, an option, and a padding part, and the source period information may be carried by the field of service type or the field of option with one byte; and the IPv6 header may include a version, a traffic class, a flow label, a payload length, a next header, a hop limit, a source address, and a destination address, and the source period information may be carried by the field of traffic class with one byte.

It should be noted that the above description of carrying the source period information in each protocol packet is merely for one implementation of the present disclosure, and does not limit the technical solutions of the present disclosure, and other extensible protocol packets are also applicable to the technical solutions of the present disclosure.

The packet sending method provided by the present disclosure is applicable to the source device. With the packet sending method, the source device enables the predetermined period length and the source period identification to be carried in the packet during sending the packet, so that the forwarding device and a receiving device can accordingly determine a corresponding forwarding period identification, and send the packet in a forwarding period corresponding to the forwarding period identification. Thus, the device in the network can select the forwarding period according to the source period information indicated in the packet, thereby avoiding the packet to be forwarded across periods, and the delay jitter can be accurately obtained.

The packet sending method and the packet forwarding method provided by the present disclosure are described in detail below in conjunction with practical applications.

Figure 8:
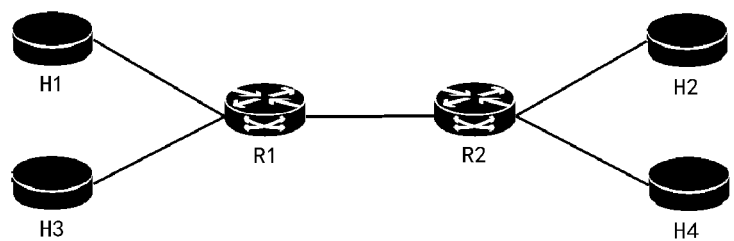
FIG. 8 is a schematic diagram of a structure of a network according to the present disclosure.

FIG. 8 is a schematic diagram of a structure of a network according to the present disclosure. As shown in FIG. 8, the network includes a first forwarding device R1, a second forwarding device R2, a first user equipment H1, a second user equipment H2, a third user equipment H3, and a fourth user equipment H4; H1 serves as a source device and sends a first target packet to H2, and H3 serves as another source device and sends a second target packet to H4; and the default period lengths include 10 μs and 25 μs, the period identification is expressed in the form of a period number, and R1 and R2 generate respective corresponding multi-period mapping tables, i.e., Table 1 and Table 2, according to related information issued by a control plane.

TABLE 1

Multi-period Mapping Table of R1

| candidate period length set | candidate period length | ingress interface period number | egress interface period number |
|---|---|---|---|
| 1 | 10 μs | 0 | 6 |
|   |       | 1 | 7 |
|   |       | 2 | 8 |
|   |       | 3 | 9 |
|   |       | 4 | 10 |
|   |       | 5 | 11 |
|   |       | 6 | 0 |
|   |       | 7 | 1 |
|   |       | 8 | 2 |
|   |       | 9 | 3 |
|   |       | 10 | 4 |
|   |       | 11 | 5 |
|   | 25 μs | 0 | 3 |
|   |       | 1 | 4 |
|   |       | 2 | 5 |
|   |       | 3 | 0 |
|   |       | 4 | 1 |
|   |       | 5 | 2 |
| 2 | 10 μs | 0 | 8 |
|   |       | 1 | 9 |
|   |       | 2 | 10 |
|   |       | 3 | 11 |
|   |       | 4 | 0 |
|   |       | 5 | 1 |
|   |       | 6 | 2 |
|   |       | 7 | 3 |
|   |       | 8 | 4 |
|   |       | 9 | 5 |
|   |       | 10 | 6 |
|   |       | 11 | 7 |
|   | 20 μs | 0 | 4 |
|   |       | 1 | 5 |
|   |       | 2 | 0 |
|   |       | 3 | 1 |
|   |       | 4 | 2 |
|   |       | 5 | 3 |
|   | 40 μs | 0 | 0 |
|   |       | 1 | 1 |

TABLE 2

Multi-period Mapping Table of R2

| candidate period length set | candidate period length | ingress interface period number | egress interface period number |
|---|---|---|---|
| 1 | 10 μs | 0 | 3 |
|   |       | 1 | 4 |
|   |       | 2 | 5 |
|   |       | 3 | 6 |
|   |       | 4 | 7 |
|   |       | 5 | 8 |
|   |       | 6 | 9 |
|   |       | 7 | 10 |
|   |       | 8 | 11 |
|   |       | 9 | 0 |
|   |       | 10 | 1 |
|   |       | 11 | 2 |
|   | 25 μs | 0 | 1 |
|   |       | 1 | 2 |
|   |       | 2 | 3 |
|   |       | 3 | 4 |
|   |       | 4 | 5 |
|   |       | 5 | 0 |
| 2 | 10 μs | 0 | 9 |
|   |       | 1 | 10 |
|   |       | 2 | 11 |
|   |       | 3 | 0 |
|   |       | 4 | 1 |
|   |       | 5 | 2 |
|   |       | 6 | 3 |
|   |       | 7 | 4 |
|   |       | 8 | 5 |
|   |       | 9 | 6 |
|   |       | 10 | 7 |
|   |       | 11 | 8 |
|   | 20 μs | 0 | 5 |
|   |       | 1 | 0 |
|   |       | 2 | 4 |
|   |       | 3 | 2 |
|   |       | 4 | 3 |
|   |       | 5 | 4 |
|   | 40 μs | 0 | 0 |
|   |       | 1 | 1 |

Each of R1 and R2 generates two candidate period length sets. In R1, a first candidate period length set includes the default period lengths of 10 μs and 25 μs, a second candidate period length set is obtained according to the default period length of 10 μs, and elements in the second candidate period length set are products of 10 and $2^m$, with $m \in \{0,1,2\}$, that is, all the candidate period lengths in the second candidate period length set form a geometric progression, with a first item being the default period length of 10 μs. R2 is similar to R1, but differs from R1 in that a mapping relationship between an ingress interface period number (identification) and an egress interface period number (identification) under each candidate period length is different.

Specifically, in a process of sending the first target packet to H2 by H1, H1 selects a predetermined period length which is equal to 10 μs, and sends the first target packet to H2 in a period having a period number of 3 and the predetermined period length of 10 μs, the first target packet carries source period information including flag bits (information) 01, the predetermined period length of 10 μs, and a source period number of 3 of a sending period; after receiving the first target packet, R1 selects a matched period length of 10 μs from the first candidate period length set thereof through matching according to the flag bits and the predetermined period length, and looks up the table with the source period number of 3 being used as an ingress interface period number, to obtain an egress interface period number of 0, thus obtaining a forwarding period number of 0, and then R1 replaces the source period number of 3 with 0 according to the forwarding period number of 0, and forwards the first target packet in a period having the period number of 0; after receiving the first target packet, R2 performs the same operations as above to determine a forwarding period number of 1 according to the source period number of 0, replace the source period number of 0 with 1 according to the forwarding period number of 1, and forward the first target packet in a period having the period number of 1; and then H2 receives the first target packet.

In a process of sending the second target packet to H4 by H3, H3 selects a predetermined period length which is equal to 10 µs, and sends the second target packet to H4 in a period having a period number of 2 and the predetermined period length of 10 µs, the second target packet carries source period information including flag bits 10, the predetermined period length of 10 µs, and a source period number of 2 of a sending period; after receiving the second target packet, R1 selects a matched period length of 10 µs from the second candidate period length set thereof through matching according to the flag bits and the predetermined period length, and looks up the table with the source period number of 2 being used as an ingress interface period number, to obtain an egress interface period number of 10, thus obtaining a forwarding period number of 10, and then R1 replaces the source period number of 2 with 10 according to the forwarding period number of 10, and forwards the second target packet in a period having the period number of 10; after receiving the second target packet, R2 performs the same operations as above to determine a forwarding period number of 7 according to the source period number of 10, replace the source period number of 7 with 10 according to the forwarding period number of 7, and forward the second target packet in a period having the period number of 7; and then H4 receives the second target packet.

Figure 9:
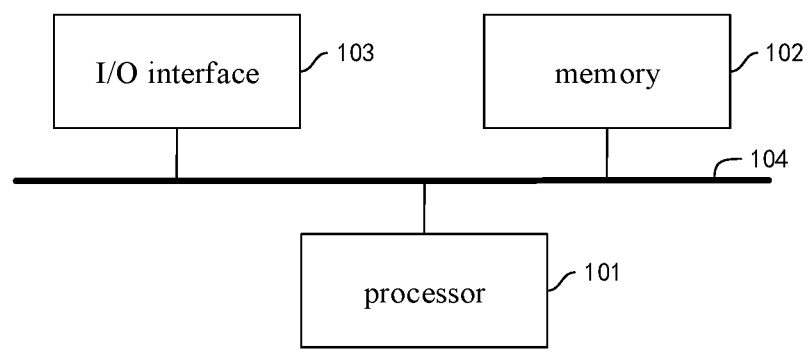
FIG. 9 is a schematic structural diagram of a forwarding device according to the present disclosure.

FIG. 9 is a schematic structural diagram of a forwarding device according to the present disclosure. As shown in FIG. 9, the forwarding device includes: at least one processor 101; a memory (storage device) 102 storing at least one program thereon, the at least one program, executed by the at least one processor 101, causes the at least one processor 101 to perform the packet forwarding method as described above; and at least one I/O interface 103 connected between the at least one processor 101 and the memory 102 and configured to enable information interaction between the at least one processor 101 and the memory 102.

Each processor 101 is a device having data processing capability, and includes, but is not limited to, a Central Processing Unit (CPU); the memory 102 is a device having data storage capability, and includes, but is not limited to, a Random Access Memory (RAM, more specifically, a Synchronous Dynamic RAM (SDRAM), a Double Data Rate SDRAM (DDR SDRAM), etc.), a Read-Only Memory (ROM), an Electrically Erasable Programmable Read-Only Memory (EEPROM), and a flash memory (FLASH); and each I/O interface (read/write interface) 103 is connected between the processor 101 and the memory 102, is configured to enable the information interaction between the processor 101 and the memory 102, and includes, but is not limited to, a data bus (Bus).

In some implementations, the processor 101, the memory 102, and the I/O interface 103 are connected to each other through a bus 104, and then are connected to other components of a computing device.

Figure 10:
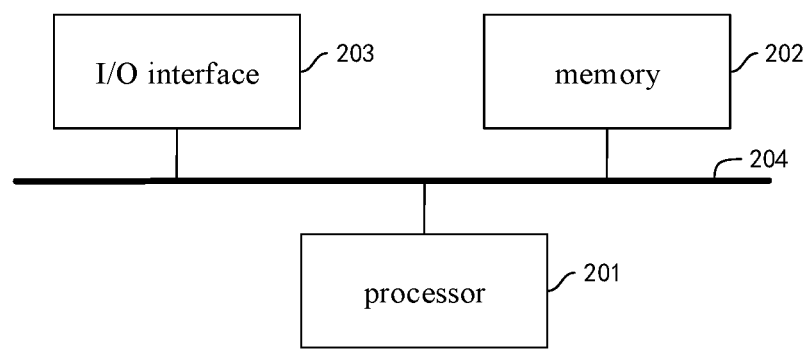
FIG. 10 is a schematic structural diagram of a source device according to the present disclosure.

FIG. 10 is a schematic structural diagram of a source device according to the present disclosure. As shown in FIG. 10, the source device includes: at least one processor 201; a memory 202 storing at least one program thereon, the at least one program, executed by the at least one processor 201, causes the at least one processor 201 to perform the packet sending method as described above; and at least one I/O interface 203 connected between the processor 201 and the memory 202 and configured to enable information interaction between the processor 201 and the memory 202.

Each processor 201 is a device having data processing capability, and includes, but is not limited to, a Central Processing Unit (CPU); the memory 202 is a device having data storage capability, and includes, but is not limited to, an RAM (more specifically, an SDRAM, a DDR SDRAM, etc.), an ROM, an EEPROM, and a FLASH; and each I/O interface (read/write interface) 203 is connected between the processor 201 and the memory 202, is configured to enable the information interaction between the processor 201 and the memory 202, and includes, but is not limited to, a data bus (Bus).

In some implementations, the processor 201, the memory 202, and the I/O interface 203 are connected to each other through a bus 204, and then are connected to other components of a computing device.

Figure 11:
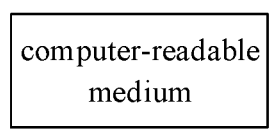
FIG. 11 is a schematic structural diagram of a computer-readable medium according to the present disclosure.

FIG. 11 is a schematic structural diagram of a computer-readable medium according to the present disclosure. The computer-readable medium has stored a computer program thereon, the computer program, executed by a processor, causes the processor to implement the packet forwarding method or the packet sending method as described above.

It should be understood by those of ordinary skill in the art that the functional modules/units in all or some of the operations and the devices in the methods disclosed above may be implemented as software, firmware, hardware, or suitable combinations thereof. If implemented as hardware, the dividing between the functional modules/units stated above is not necessarily corresponding to the dividing of physical components; for example, one physical component may have a plurality of functions, or one function or operation may be performed through cooperation of several physical components. Some or all of the physical components may be implemented as software executed by a processor, such as a CPU, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable medium used in any method or technology for storing information (such as computer-readable instructions, data structures, program modules and other data). The computer storage medium includes, but is not limited to, an RAM, an ROM, an EEPROM, a FLASH or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication medium generally includes computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details may be made without departing from the scope of the present disclosure as claimed by the appended claims.

What is claimed is:

1. A packet forwarding method, applied to a forwarding device, comprising:
receiving a target packet carrying source period information which comprises a predetermined period length corresponding to a sending period for a source device sending the target packet to the forwarding device and a source period identification of the sending period;
determining a corresponding forwarding period identification according to the predetermined period length and the source period identification; and
forwarding the target packet in a forwarding period corresponding to the forwarding period identification, with a length of the forwarding period being the same as the predetermined period length,
wherein the determining a corresponding forwarding period identification according to the predetermined period length and the source period identification comprises:
selecting a corresponding candidate period length from a plurality of different candidate period lengths through matching according to the predetermined period length, taking the selected candidate period length as a matched period length, the matched period length is equal to the length of the forwarding period, finding a corresponding egress interface period identification based on the matched period length by looking up a multi-period mapping table with the source period identification being used as an ingress interface period identification, and taking the egress interface period identification as the forwarding period identification;
wherein the multi-period mapping table records a mapping relationship between an ingress interface period identification and an egress interface period identification corresponding to each of the plurality of different candidate period lengths.

2. The packet forwarding method of claim 1, further comprising:
before receiving the target packet, determining the plurality of candidate period lengths according to a preset period selection policy, establishing the mapping relationship between the ingress interface period identification and the egress interface period identification for each of the candidate period lengths, and generating the multi-period mapping table.

3. The packet forwarding method of claim 2, wherein the determining the plurality of candidate period lengths according to a preset period selection policy and establishing the mapping relationship between the ingress interface period identification and the egress interface period identification for each of the candidate period lengths comprises:
generating at least one candidate period length set according to a preset default period length, and establishing the mapping relationship between the ingress interface period identification and the egress interface period identification for each of the candidate period lengths in all candidate period length sets;
wherein all the candidate period length sets, that are generated, comprise one of: a first set comprising the default period length; a second set, in which all the candidate period lengths form an arithmetic progression having the default period length as a first term; or a third set, in which all the candidate period lengths form a geometric progression having the default period length as a first term.

4. The packet forwarding method of claim 1, further comprising:
between the determining a corresponding forwarding period identification according to the predetermined period length and the source period identification and the forwarding the target packet in a forwarding period corresponding to the forwarding period identification, replacing the source period identification in the source period information carried by the target packet with the forwarding period identification.

5. A computer-readable medium storing a computer program thereon, the computer program, executed by a processor, causes the processor to perform the packet forwarding method of claim 1.

6. A packet sending method, applied to a source device, comprising:
selecting a predetermined period length, and sending a target packet to a forwarding device in a sending period corresponding to the predetermined period length, with the target packet carrying source period information configured to indicate the sending period, and the source period information comprising the predetermined period length corresponding to the sending period and a source period identification of the sending period,
wherein a corresponding candidate period length is selected by the forwarding device from a plurality of different candidate period lengths through matching according to the predetermined period length, the selected candidate period length is taken as a matched period length, the matched period length is equal to a length of a forwarding period for forwarding the target packet, a corresponding egress interface period identification is found based on the matched period length by looking up a multi-period mapping table in the forwarding device with the source period identification being used as an ingress interface period identification, and the egress interface period identification is taken as a forwarding period identification; wherein the multi-period mapping table records a mapping relationship between an ingress interface period identification and an egress interface period identification corresponding to each of the plurality of different candidate period lengths.

7. The packet sending method of claim 6, wherein the source period information is carried by any one of a slot cell, a Layer-2 Ethernet frame, an IPV4 header, or an IPV6 header.

8. The packet sending method of claim 6, wherein a plurality of candidate period length sets are generated in the forwarding device; and the source period information further comprises flag information configured to indicate a candidate period length set to which the predetermined period length belongs.

9. A forwarding device, comprising:
at least one processor; and a memory configured to store at least one program;

the at least one program, executed by the at least one processor, causes the at least one processor to perform the packet forwarding method of claim 1.

10. A source device, comprising:

at least one processor; and a memory configured to store at least one program;

the at least one program, executed by the at least one processor, causes the at least one processor to perform the packet sending method of claim 6.

11. A computer-readable medium storing a computer program thereon, the computer program, executed by a processor, causes the processor to perform the packet sending method of claim 6.

* * * * *